US012149933B2

(12) United States Patent
de la Oliva et al.

(10) Patent No.: US 12,149,933 B2
(45) Date of Patent: Nov. 19, 2024

(54) DISTRIBUTING SERVICE INFORMATION

(71) Applicant: INTERDIGITAL PATENT HOLDINGS, INC., Wilmington, DE (US)

(72) Inventors: Antonio de la Oliva, Pinto (ES); Robert Gazda, Spring City, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 367 days.

(21) Appl. No.: 17/775,390

(22) PCT Filed: Nov. 6, 2020

(86) PCT No.: PCT/US2020/059515
§ 371 (c)(1),
(2) Date: May 9, 2022

(87) PCT Pub. No.: WO2021/092467
PCT Pub. Date: May 14, 2021

(65) Prior Publication Data
US 2022/0408250 A1    Dec. 22, 2022

Related U.S. Application Data

(60) Provisional application No. 62/932,079, filed on Nov. 7, 2019.

(51) Int. Cl.
H04W 4/06         (2009.01)
H04W 12/06        (2021.01)
(52) U.S. Cl.
CPC ............. *H04W 12/06* (2013.01); *H04W 4/06* (2013.01)
(58) Field of Classification Search
CPC ............................... H04W 8/00; H04W 92/18
See application file for complete search history.

(56) References Cited

U.S. PATENT DOCUMENTS 8,935,754 B2   1/2015  Mccann et al.
9,125,143 B2   9/2015  Canpolat et al.
(Continued)

FOREIGN PATENT DOCUMENTS

CN    102415072 A    4/2012
CN    102546792 A    7/2012
(Continued)

OTHER PUBLICATIONS

Ansley et al., "802.11bc Functional Requirements Document", IEEE P802.11 Wireless LANs, Jan. 2019, pp. 1-5.
(Continued)

*Primary Examiner* — Michael T Vu
(74) *Attorney, Agent, or Firm* — Condo Roccia Koptiw LLP

(57) ABSTRACT

Service information (e.g., enhanced broadcast service (eBCS) information) may be distributed. Service (e.g., eBCS) capabilities may be advertised (e.g., by an access point (AP)), for example, by broadcasting a public action frame. A public action frame may include per-service information. A public action frame may be transmitted on a per service basis. A public action frame may combine authentication information and service information. Enhanced broadcast service origin authentication may be performed on a per service basis (e.g., using origin authentication information to authenticate broadcast data frames for a consumed service). Origin authentication information may be common to frames associated with different services. Services may be consumed without querying a service originating device. Stations (e.g., with and without association with an AP) may report consumption or usage of services, Reporting may be unsolicited or solicited (e.g., in response to a request from an AP).

14 Claims, 11 Drawing Sheets

(56) References Cited

U.S. PATENT DOCUMENTS

| | | |
|---|---|---|
| 9,497,598 B2 | 11/2016 | Liu |
| 2008/0225778 A1 | 9/2008 | Vare et al. |
| 2015/0371273 A1 | 12/2015 | Canpolat et al. |
| 2015/0381676 A1 | 12/2015 | Seok |
| 2016/0021609 A1 | 1/2016 | Park et al. |
| 2016/0149901 A1* | 5/2016 | Liu ................ H04W 12/50 726/5 |
| 2016/0150357 A1* | 5/2016 | Jung ................ H04W 4/80 455/41.1 |
| 2018/0027479 A1 | 1/2018 | Ahmad et al. |
| 2018/0027487 A1 | 1/2018 | Pang et al. |
| 2018/0041946 A1 | 2/2018 | Park et al. |
| 2020/0015043 A1* | 1/2020 | Patil ................ H04W 4/06 |

FOREIGN PATENT DOCUMENTS

| | | |
|---|---|---|
| CN | 102684844 A | 9/2012 |
| CN | 104066148 A | 9/2014 |
| CN | 104813689 A | 7/2015 |
| CN | 105007568 A | 10/2015 |
| CN | 105075297 A | 11/2015 |
| CN | 106465238 A | 2/2017 |
| CN | 106713253 A | 5/2017 |
| CN | 108260188 A | 7/2018 |

OTHER PUBLICATIONS

Ansley et al., "TGbc Specification Framework Document", IEEE P802.11 Wireless LANs, Draft P802.11bc D0.0, Aug. 29, 2019, 10 pages.

Morioka, Hitoshi, "eBCS Frame Authentication Proposal", IEEE 802.11-19/0451r4, Sep. 2019, pp. 1-37.

Morioka, Hitoshi, "eBCS Frame Authentication Proposal", IEEE 802.11-19/0451r5, Sep. 2019, 38 pages.

Morioka, Hitoshi, "SFD Proposal", IEEE 802.11-19/1399r4, IEEE P802.11 Wireless LANs, Sep. 2019, 5 pages.

Oliva et al., "Per-Service Origin Authentication", IEEE 802.11-19/1978r1, Nov. 2019, 7 pages.

Wang et al., "IEEE 802.11bc Use Case Document", IEEE 802.11-19/0268r5, Jul. 2019, pp. 1-14.

Morioka, Hitoshi, "SFD Proposal", IEEE P802.11 Wireless LANs; IEEE 802.11-yy/xxxxr0, Sep. 2019, 5 pages.

\* cited by examiner

| Category | eBCS Public Action | eBCS Sequence number | OA | Public Key | Signature | Timestamp | CP | Common eBCS Origin Authentication Parameters | eBCS Service count | eBCS service list |
|---|---|---|---|---|---|---|---|---|---|---|
| 1 | 1 | 2 | 1 Bit | variable | variable | 8 | 1 bit | 0-variable | 1 | 0-variable |

Octets

FIG. 2

| Group | Public Key | Certificate ID |
|---|---|---|
| 2 | Variable | Variable |

Octets

FIG. 3

| Length | eBCS Sequence number | Key of current sequence | Distance | Key of the last index | Key of distance | eBCS Info frame period | eBCS rekeying period |
|---|---|---|---|---|---|---|---|
| 16 | 2 | Variable | 8 | Variable | Variable | 2 | 2 | bits

FIG. 4

| Length | eBCS ID | Content with restriction | Human readable description | URL | eBCS Service Origin Authentication | eBCS Origin Authentication parameters |
|---|---|---|---|---|---|---|
| 16 | Variable | 1 | Variable | Variable | 1 | variable | bits

FIG. 5

| Type | Element |
|---|---|
| 1 | Variable |

Octets

FIG. 6

| Category | eBCS Public Action | Dialog Token |
|---|---|---|
| 1 | 1 | 1 |

Octets

FIG. 9

| Category | eBCS Action | Dialog Token | eBCS ID count | eBCS ID list |
|---|---|---|---|---|
| 1 | 1 | 1 | 1 | variable |

Octets

FIG. 10

| Type | Element |
|---|---|
| 1 | Variable |

Octets

FIG. 11

DISTRIBUTING SERVICE INFORMATION

CROSS-REFERENCE TO RELATED APPLICATIONS

This application is the National Stage Entry under 35 U.S.C. § 371 of Patent Cooperation Treaty Application No. PCT/US2020/059515, filed Nov. 6, 2020, which claims the benefit of Provisional U.S. Patent Application No. 62/932,079, filed Nov. 7, 2019, the disclosure of which is incorporated herein by reference in its entirety.

BACKGROUND

Wireless communication devices may establish communications with other devices and data networks via various access networks. For example, a wireless communication device may establish communications via a wireless local area network (WLAN) (e.g., an Institute of Electrical and Electronics Engineers (IEEE) 802.11 WLAN) and/or a radio access network (RAN) (e.g., a 3GPP RAN). A wireless communication device may access an 802.11 WLAN and/or 3GPP network, for example, to communicate with other wireless devices and/or to access data networks that may be communicatively coupled with the 802.11 WLAN and/or 3GPP RAN.

SUMMARY

Systems, methods and instrumentalities are disclosed herein (e.g., including via example implementations) for distributing service information, for example, in a network (e.g., in 802.11 networks, 3GPP networks, etc.). Service information may relate to, for example, enhanced broadcast services (eBCS). Enhanced broadcast services may be identified in service information flows, for example, based on (e.g., by use of) multicast addresses and/or a higher layer identifier (ID) (e.g., an internet protocol (IP) multicast address).

An access point (AP) may advertise eBCS capabilities and services, for example, by broadcasting a public action frame. Advertisement and discovery of eBCS services may be made, for example, without (e.g., requiring) transmission from a consuming station. A public action frame may comprise (e.g., include), for example, information specifying a category of service and/or a type of public action. A public action frame may (e.g., further) include information that may be used to authenticate the source (e.g., origin) of an eBCS service. An origin authentication may be performed, for example, on a per service basis. An eBCS public action frame may include, for example, one or more of the following (e.g., elements): a public key field, an authentication parameters field, and/or service list elements, which may specify one or more aspects of the services.

A public action frame (e.g., and the information therein) may be transmitted, for example, on a per-service basis. A public action frame may include origin authentication information and/or eBCS service discovery information. A public action frame may be configured, for example, so that multiple frames may be authenticated (e.g., through a common key and mechanism). The eBCS service information may be (e.g., periodically) transmitted periodically. The eBCS service information may include (e.g., common) eBCS origin authentication parameters and/or parameters that may be used to authenticate (e.g., multiple) frames.

Consumption or usage of services by stations may be reported. Two or more public action frames may be employed, for example, to discover eBCS services consumed by stations. An eBCS membership request frame may be sent to a station. An eBCS membership request frame may request that a station identify eBCS services that the station may consume and/or may be consuming. A station may indicate (e.g., identify) eBCS services the station may use or may be using (e.g., consuming), for example, in a response (e.g., an eBCS membership response frame). A station may generate an eBCS membership response frame identifying zero or more eBCS services that the particular station may consume or may be consuming. Reporting (e.g., by a station) may be solicited or unsolicited.

In examples, methods may be implemented for distributing service information. Methods may be implemented (e.g., in whole or in part), for example, by one or more devices, apparatuses, and/or systems (e.g., a WTRU such as a STA and/or UE, a network node such as an AP or a gNodeB (gNB), and/or the like), which may comprise one or more processors configured to execute the methods (e.g., in whole or in part) as computer executable instructions that may be stored on a computer readable medium or a computer program product, that, when executed by the one or more processors, performs the methods. The computer readable medium or the computer program product may comprise instructions that cause one or more processors to perform the methods by executing the instructions. Although a device used in examples herein may be associated with a certain network, other device(s) (e.g., analogous device(s) in the same or different networks) may perform like actions.

A WTRU may include a processor configured (e.g., programmed with executable instructions to implement a method) to receive a broadcast frame, where the broadcast frame may include per-service information; receive origin authentication information; determine to use a service indicated in the broadcast frame; receive a broadcast data frame associated with a single service, where the broadcast data frame may be associated with the broadcast frame; and use the origin authentication information to authenticate the broadcast data frame associated with the service.

The per-service information may include a service definition. The origin authentication information may include a per-service authentication parameter.

The origin authentication information may be included in the broadcast frame. The origin authentication information may be per-service authentication information.

The per-service information and the origin authentication information included in the broadcast frame may be associated with a single service.

The origin authentication information may be common to frames associated with different services.

The processor may be (e.g., further) configured (e.g., programmed with executable instructions to implement a method) to send a frame that indicates one or more services that the WTRU is using.

The frame that indicates one or more services that the WTRU is using may be sent in response to reception of a frame that requests the WTRU indicate one or more services that the WTRU is using.

The frame that indicates one or more services that the WTRU is using may include one or more respective identifiers associated with the indicated one or more services.

The service may be used without the WTRU having sent a query to an originating device.

This Summary is provided to introduce a selection of concepts in a simplified form that are further described herein in the Detailed Description. This Summary is not

BRIEF DESCRIPTION OF THE DRAWINGS

FIG. 2 depicts an example format of an example eBCS information frame.

FIG. 3 depicts an example of a public key field.

FIG. 4 depicts an example of an eBCS authentication parameters field.

FIG. 5 depicts an example of an eBCS service list.

FIG. 6 depicts an example format for an example eBCS ID field.

FIG. 9 depicts an example format for an example eBCS membership request frame.

FIG. 10 depicts an example of an eBCS membership response frame.

FIG. 11 depicts an example of an eBCS ID list.

DETAILED DESCRIPTION

Systems, methods and instrumentalities are disclosed herein (e.g., including via example implementations) for distributing (e.g., eBCS) service information. Service (e.g., eBCS) capabilities may be advertised (e.g., by an access point (AP)), for example, by broadcasting a public action frame. A public action frame may include per-service information. A public action frame may be transmitted on a per service basis. A public action frame may combine authentication information and service information. Enhanced broadcast service origin authentication may be performed on a per service basis (e.g., using origin authentication information to authenticate broadcast data frames for a consumed service). Origin authentication information may be common to frames associated with different services. Services may be consumed without querying a service originating device. Stations (e.g., with and without association with an AP) may report consumption or usage of services. Reporting may be unsolicited or solicited (e.g., in response to a request from an AP).

Figure 1A:
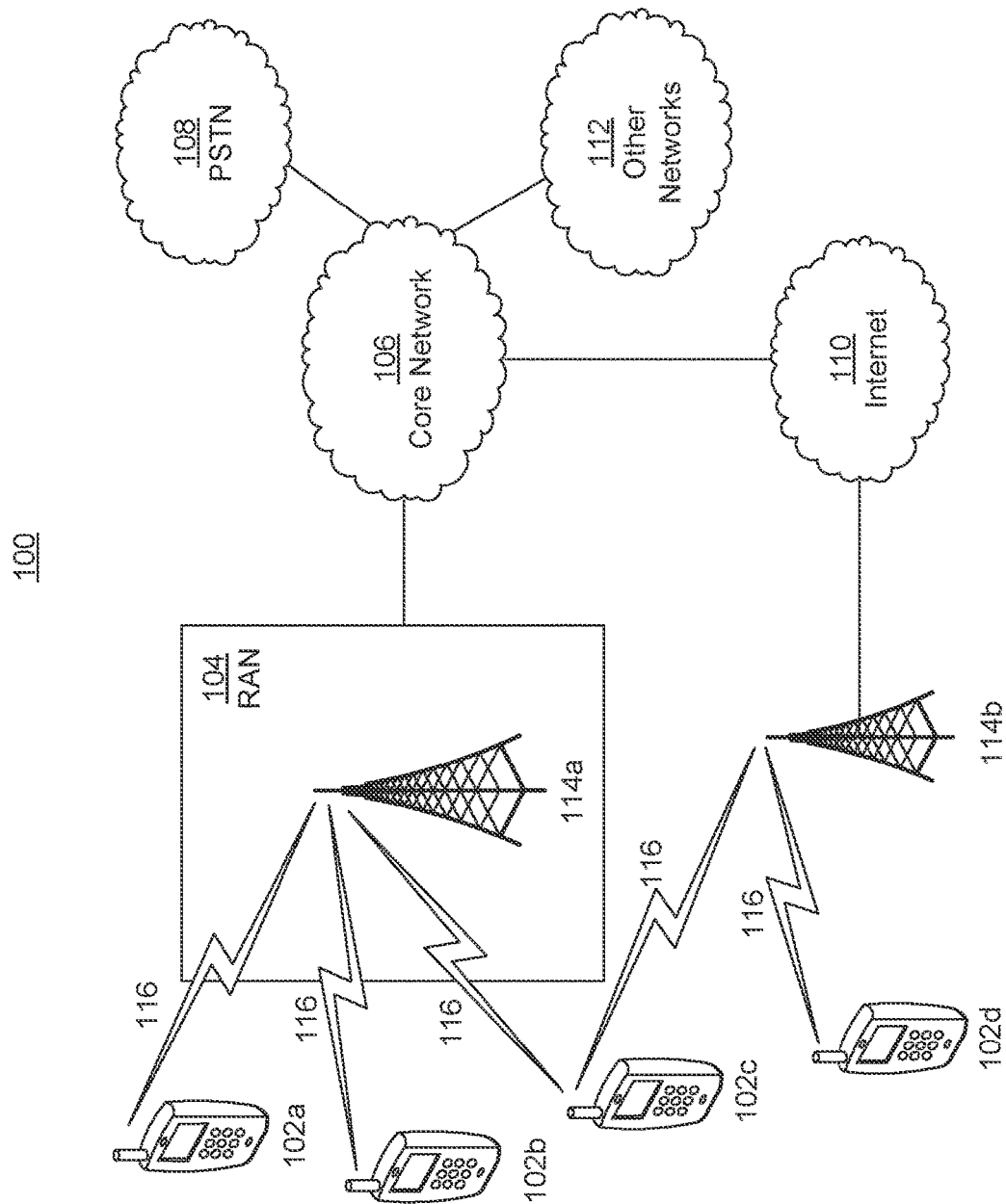
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
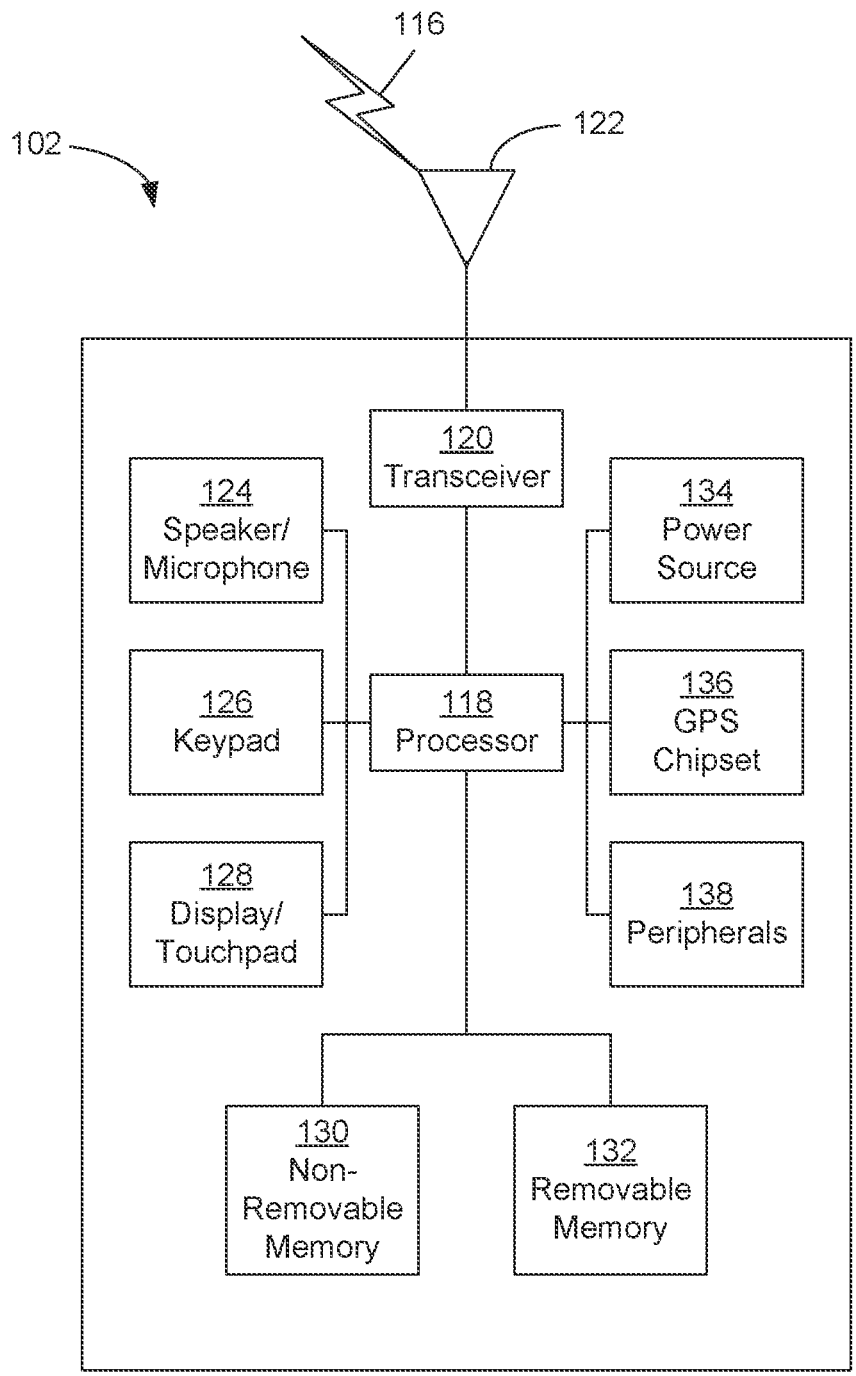
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
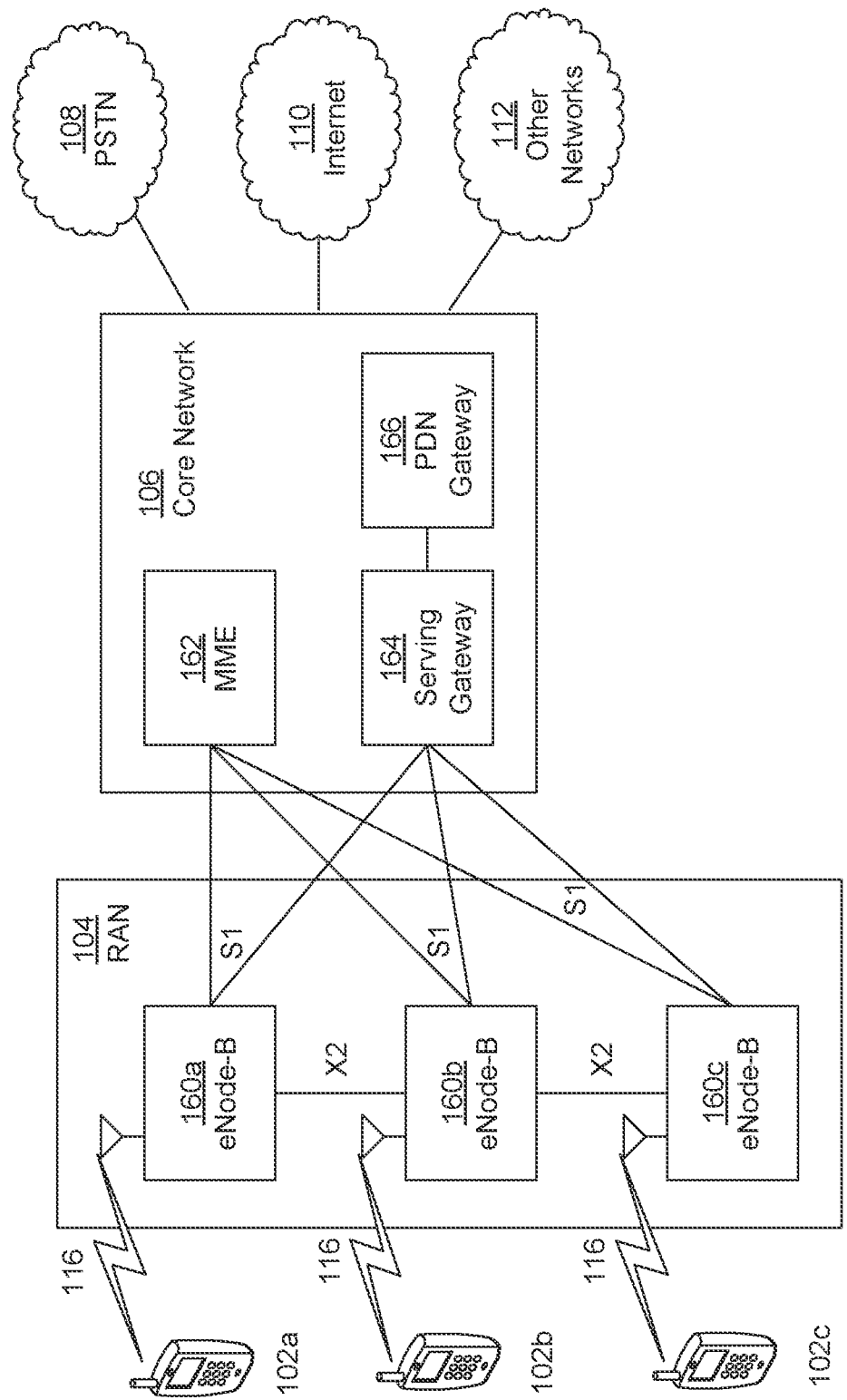
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11 ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11 ah supports 1 MHz, 2 MHz, 4 MHz, 8 MHz, and 16 MHz bandwidths using non-TVWS spectrum. According to a representative embodiment, 802.11ah may support Meter Type Control/

Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
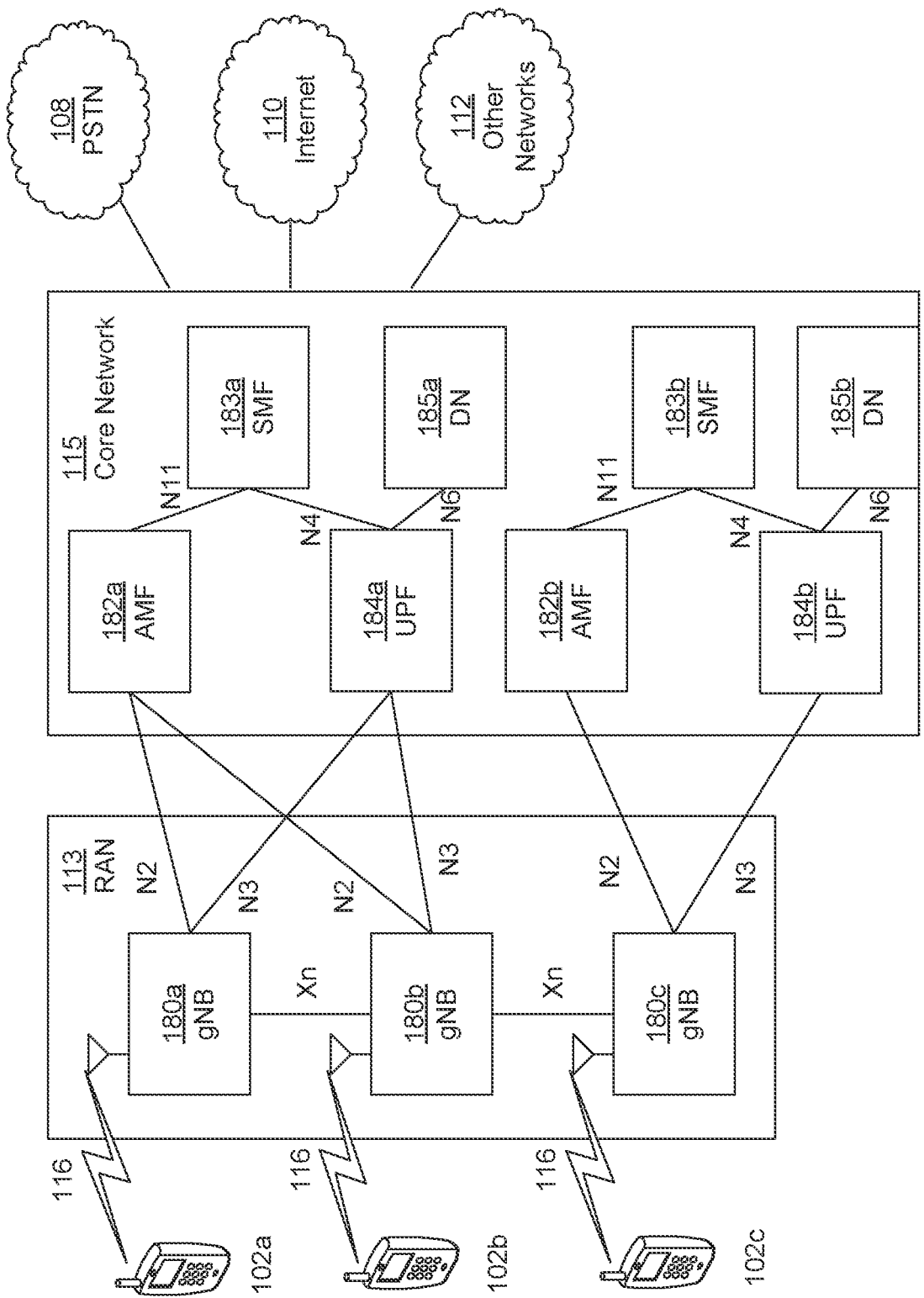
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods and instrumentalities are disclosed herein (e.g., including via example implementations) for distributing (e.g., eBCS) service information. Service (e.g., eBCS) capabilities may be advertised (e.g., by an access point (AP)), for example, by broadcasting a public action frame. Although the term public action frame may be used as an example herein, the frame may be any type of frame. A public action frame may include per-service information. A public action frame may be transmitted on a per service basis. A public action frame may combine authentication information and service information per service (e.g., in a single frame). Enhanced broadcast service origin authentication may be performed on a per service basis (e.g., using origin authentication information to authenticate broadcast data frames for a consumed service). Origin authentication information may be common to frames associated with different services. Services may be consumed without querying a service originating device. Stations (e.g., with and without association with an AP) may report consumption or usage of services. Reporting may be unsolicited or solicited (e.g., in response to a request from an AP).

A future home, such as a beyond 5G (B5G) home that may be used as an example herein, may provide (e.g., a wide range of innovative) applications and/or services to people and/or devices, such as, for example: immersive mixed-reality gaming; home security/surveillance (e.g., monitoring by autonomous drones, etc.); in-home health care and aging care; holoportation and/or hologram creation (e.g., on lightweight extended reality (XR) glasses); and/or other applications and/or services. Applications and/or services may be realized (e.g., implemented), for example, with one or more devices. For example, a home may include one or multiple devices, which may have one or more (e.g., wide ranging) capabilities (e.g., to implement one or more applications and/or services). Devices may be (e.g., wirelessly) connected, for example, via a range of access technologies. A device may cooperate with one or more other devices (e.g., devices may cooperate with each other) to provide, for example, broadcast and/or multicast services, e.g., for distributing video, sensor information, and/or other data.

Medium access control (MAC) may support (e.g., enable) enhanced transmission and reception of broadcast data in an infrastructure basic service set (BSS) and/or in enhanced broadcast services (eBCS). For example, IEEE 802.11bc may indicate/specify one or more modifications to an IEEE 802.11 MAC specification to support enhanced transmission and reception in a BSS and/or in eBCS. An infrastructure BSS may involve (e.g., include) an association between one or more transmitters and one or more receivers. An eBCS may not involve (e.g., include) an association between one or more transmitters and one or more receivers. Functionality (e.g., provided by IEEE 802.11bc) that may be implemented in systems, devices, and/or methods may (e.g., also) include origin authenticity protection for broadcast data frames (e.g., associated with a service).

Systems, devices, and/or methods (e.g., implementing IEEE 802.11bc functionality) may be used, for example, in a B5G future home. For example, stadium video distribution may apply to (e.g., be supported or provided by and/or implemented in) a B5G future home implementation. Stadium video distribution may involve providing eBCS for videos to many densely located stations (STAs). The STAs may be associated or unassociated with an access point (AP). STAs may or may not transmit.

A low power sensor UL broadcast may be applicable to a B5G future home implementation. Internet of things (IoT) devices (e.g., pre-configured IoT devices) may (e.g., automatically) connect to an end server, for example, through eBCS APs and/or may operate with little or no setup. IoT devices may be low power, mobile IoT devices reporting to servers, for example, through eBCS APs without scanning and association. Processing (e.g., as described herein) may be applicable (e.g., in B5G future home implementations), for example, with higher-power/high-data sensors (e.g., camera, radar, light detection and ranging (LIDAR), and/or other sensors).

Intelligent transportation broadcast may be applicable to B5G future home implementations. An eBCS service for transportation related information (e.g., for railway crossings) may be provided, for example, by connected vehicle roadside equipment (RSE), connected vehicle(s) (e.g., with on-board equipment (OBE)), and/or personal informational device(s) (PID(s)). An RSE may provide an eBCS service for local traveler information.

Broadcast services for event production may be applicable to B5G future home implementations. Broadcast services for event production may include, for example, providing eBCS for multiple data streams that may be suitable for different customer STAs. The number of STAs may be large. STAs may be static or mobile.

Multi-lingual and/or emergency broadcast may be applicable to B5G future home implementations. Multi-lingual and/or emergency broadcast may include providing eBCS for emergency and/or multi-lingual service to multiple (e.g., many) densely located STAs. The STAs may be associated or unassociated with an AP. The STAs may or may not transmit. The STAs may be static or mobile.

VR eSports video distribution may be applicable to B5G future home implementations. For example, eBCS may distribute video (e.g., a view of a player) to an audience, which may be at a location of a VR eSports game, such as an arena.

Multi-channel data distribution may be applicable to B5G future home implementations. Multi-channel data distribution may include, for example, an AP broadcasting (e.g., the same) information in different languages (e.g., each in a dedicated channel). A user may choose, for example, one or more of the channels.

Lecture room slide distribution may be applicable to B5G future home implementations. Lecture room slide distribution may include, for example, (e.g., simultaneous) distribution of slides on a screen to one or more audience computing devices (e.g, PCs, tablets, etc.). A slide distribution may be provided to an audience with or without downloading visual aids and/or changing pages. Slide distribution to an audience (e.g., students) may be synchronized. Slide distribution may provide for (e.g., support) in home sharing.

A regional based broadcast television (TV) service may be applicable to B5G future home implementations. Local news and/or television content (e.g., originating from a TV company) may be distributed to a consumer device (e.g., a bring your own device (BYOD)), which may or may not be a TV receiver. Evacuation information may be distributed (e.g., in times of a crisis, such as a natural disaster) with or without (e.g., complex) customer operation.

AP tagged uplink (UL) forwarding may be applicable to B5G future home implementations. A tracker device (e.g., a re-configured low-cost low power tracker device) may (e.g., automatically) connect to an end server, for example, through one or more eBCS APs in a neighborhood (e.g., with little or no setup action). A tracker device may (e.g., periodically) report to a server (e.g., through one or more eBCS APs) without scanning and association. An eBCS AP may append metadata (e.g., IP address, date/time, location, received signal strength indicator (RSSI), and/or the like) to packets (e.g., before forwarding the packets to the destination server). Meta-data from an eBCS AP may be protected.

Service information (e.g., for one or more applications and/or services, as described herein and/or elsewhere) may be distributed, for example, so that STAs (e.g., whether associated or not associated with an AP) may (e.g., be configured/enabled to) obtain and process service information. In some examples (e.g., environments or scenarios), an STA may not be capable of transmitting or may determine to not transmit. A request/response mechanism (e.g., based on an access network query protocol (ANQP)) may or may be used in one or more examples.

Service information may be distributed, for example, based on implementation characteristics, such as one or more of the following: processing may use public action frames to deliver management information; processing may provide origin authenticity protection for broadcast data frames (e.g., received by an STA); processing may support modes of operation (e.g., a first mode where there is an association between transmitter(s) and receiver(s), such as in an infrastructure BSS, and a second mode where without an association between transmitter(s) and receiver(s)); there may or may not be an association and/or handshake between an STA and an AP; processing may support (e.g., have a mechanism to facilitate) discovery of STAs consuming a broadcast service; and/or processing may support (e.g., have a mechanism for) advertisement (e.g., by eBCS APs) of eBCS capabilities and eBCS services (e.g., provided by an eBCS AP).

A time efficient stream loss-tolerant authentication (TESLA) protocol may (e.g., be used to) authenticate an AP, for example, to provide origin authenticity protection for broadcast data frames (e.g., using public action frames to deliver management information). TESLA may be a one-way key chain algorithm. TESLA may allow for checking integrity and authenticating the source of a (e.g., each) packet in multicast or broadcast data streams (e.g., using low-cost operations). Implementation of a TESLA protocol may involve recurrent authentication of frames. A receiving station may buffer K frames, which may be authenticated, for example, every Tk seconds (e.g., if/when an AP makes a key public). Authentication of a frame Ki−1 may be based on the prior verification of frame Ki. Multiple (e.g., all) frames may be related (e.g., to each other) and/or may be buffered.

Higher layer origin authentication may be used (e.g, may also be used). For example, higher layer origin authentication may be used (e.g., may also be used) within the same service origin authentication frame.

Advertisement of one or more eBCS services may be provided by one or more mechanisms (e.g., procedures/methods). Discovery of one or more STAs consuming one or more broadcast services may be provided by one or more mechanisms.

In some examples, stations (e.g., associated and/or non-associated with an AP) that may (e.g., be configured, enabled, and/or permitted to) transmit may coexist with stations that may not (e.g., be configured, enabled, and/or permitted to) transmit (e.g., receiver-only stations). Discovery and use of eBCS services may be supported (e.g., by access network query protocol (ANQP)), for example, if/when a device may (e.g., be configured, enabled, and/or permitted to) transmit information. A consuming device (e.g., a device that may seek and/or use one or more eBCS services) may or may not transmit information to discover, use, and/or report usage of eBCS. In some examples (e.g., usage scenarios, such as sensors or TV set top boxes), a consuming device may not transmit (e.g., in relation to consuming eBCS services).

Origin authentication may be implemented by one or more mechanisms. An authentication procedure may determine/indicate whether one or more received frames were transmitted by an AP that the STA is listening to.

There may be a single authentication key for multiple (e.g., all) eBCS frames sent by an AP, which may be assumed by a TESLA implementation. One or more (e.g., all) STAs may buffer (e.g., a considerable number of) frames (e.g., to authenticate the frames). A STA may consume a subset of frames (e.g., frames for the eBCS service being consumed by the STA). Different (e.g., TESLA) keys may be used for (e.g., each of several) different eBCS services. A STA listening to a eBCS service (e.g., via a channel) may reduce the consumption of resources, for example, by buffering frames (e.g., only) for the eBCS service/channel consumed by the STA.

Discovery of STAs consuming one or more services may be implemented by one or more mechanisms. For example, stations (STAs) listening to one or more eBCS services may be queried to determine the one or more eBCS services.

Service information (e.g., eBCS service information) may be distributed, for example, based on (e.g., consistent with) one or more implementation characteristics (e.g., as described herein). An STA querying mechanism may be based on (e.g., consistent with) one or more implementation characteristics (e.g., as described herein).

Systems, methods and instrumentalities disclosed herein (e.g., via example implementations and techniques) may perform, for example, one or more of the following: identify one or more eBCS services; advertise and/or disseminate eBCS services (e.g., without transmission of information by a potential or actual consuming device, for example, to discover the service, and/or while providing per-service origin authentication); receive a (e.g., broadcast) frame (e.g., including per-service information); receive (e.g., origin) authentication information; select (e.g., determine to use or consume) one or more (e.g., advertised) services (e.g., indicated in a frame including service information); receive a (e.g., broadcast) data frame associated with a (e.g., single) service (e.g., the selected service) and/or associated with the (e.g., broadcast) frame (e.g., including per-service information); authenticate the broadcast data frame (e.g., associated with the selected/used/consumed service) using the origin authentication information; and/or gather (e.g., collect) usage or membership information on devices consuming one or more eBCS services. Services (e.g., eBCS services) may be identified by one or more implementations disclosed herein. Examples are provided for eBCS frame format and operations. Identifiers (IDs) may (e.g., be used to) identify eBCS services. IDs may be used (e.g., in processing) for the identification of eBCS services within frames.

Flows may be identified (e.g., in eBCS) for (e.g., individual) broadcast services. Occupied channel bandwidth (OCB) transmission may be used. STAs may transmit (e.g., an OCB transmission) with a destination address and a basic service set identifier (BSSID) address set to wildcards (e.g., all ones). Addresses set to wildcards may not support (e.g., allow) identification of specific flows at the MAC layer. Inspection may be performed (e.g., by higher layers) to identify a (e.g., each) flow. An (e.g., individual) eBCS flow may be identified by one or more (e.g., two) mechanisms. For example (e.g., in a first mechanism), multicast (e.g., groupcast addresses) may be used to identify an eBCS flow. Transmissions from an AP to STAs may use a multicast L2 address as a destination, which may support (e.g., enable) identification of different eBCS services. For example (e.g., in a second mechanism), a higher layer ID may be used (e.g., an IP multicast address, MPEG streams, and/or transport protocol and ports) to identify an eBCS flow.

There may be multiple types of transmissions from STAs to APs (e.g., STAs generating an eBCS service). For example (e.g., in a first type of transmission), transmission from a non-associated STA may use OCB, where a higher layer identifier (e.g., a destination IP address) may be used to differentiate services. For example (e.g., in a second type of transmission), transmission from associated STAs may use a multicast (e.g., groupcast) L2 address to differentiate an eBCS.

Information (e.g., eBCS information) may be delivered, for example, by a public action frame. An AP (e.g., eBCS APs) may advertise eBCS capabilities and eBCS services provided by the AP. Management operations may use public action frames. A public action frame may be sent (e.g., transmitted), for example, as broadcast, multi-cast, or periodic unicast. A public action frame may be used to advertise eBCS services provided by a STA that provides (e.g., generates) an eBCS service (e.g., AP and non-AP service(s)).

References to IEEE 802.11 may refer to one or more versions, such as the IEEE 802.11-2016 version.

An eBCS public action frame may include category and action field values. Table 1 shows an example of public action frame categories and values, including an eBCS public action frame category and value (e.g., 34, as shown by example in Table 1).

TABLE 1

Example of public action frame categories and values

| Public Action field values | Description |
| --- | --- |
| 0 | 20/40 BSS Coexistence Management |
| 1 | DSE enablement |
| 2 | DSE de-enablement |
| 3-33 | . . . |
| 34 (for example) | eBCS |

One or more public action frame formats may be provided (e.g., defined, configured) to support eBCS. Table 2 shows an example of eBCS public action field value(s) associated with a (e.g., each) frame format within an eBCS category.

TABLE 2

Example of eBCS Public Action field values

| eBCS Public Action field value | Meaning |
| --- | --- |
| 0 | eBCS Information frame |

Service information (e.g., per eBCS service information) may be carried, for example, in different frames. Frames may include per service origin authentication information (e.g., as disclosed herein).

Origin authentication may be provided per service. An (e.g., a single) eBCS source and an (e.g., a single) eBCS service may be authenticated, for example, based on (e.g., using) the contents (e.g., components) of an eBCS information frame. The contents of a frame may include, for example, one or more of the following: $K_{s,N}$ (e.g., where s may be a sequence number of eBCS information); $K_{s-1,L}$ (e.g., where L may be the last used key index); $K_{s-1,L+d-1}$; a timestamp; $T_I$; $T_K$; d; an eBCS information sequence number; a public key with a certificate authority (CA) signature; and/or a signature by the sender's private key.

A key of a current sequence field may indicate a key that may be used to protect an eBCS information frame (e.g., $K_{s,N}$, where s may be a sequence number carried in the eBCS Sequence number field). A distance field may correspond to the number of frames to be buffered for a service (e.g., referred to as d). The key of the last index field may correspond to the key with the last used key index (e.g., referred to as $K_{s-1,L}$). The key of a distance field may correspond to the key to be used for the last frame in the period, for example, at a distance d from the starting frame (e.g., referred to as $K_{s-1,L+d-1}$). An eBCS information frame period field may represent the number of time units (TUs) between eBCS information frames carrying key information for an eBCS service (e.g., referred to as $T_I$). An eBCS rekeying period field may represent the number of TUs between changes in the key for the eBCS service (e.g., referred to as $T_k$).

Frame components may be divided into multiple (e.g., two) categories (e.g. per service and common to multiple or all services). Components that may be common to multiple (e.g., all) services may include, for example, one or more of the following: an eBCS information sequence number; a public key with a CA signature; a signature by the sender's private key; and/or a timestamp. Components that may be per service may include, for example, one or more of the following: $K_{s,N}$; $K_{s-1,L}$; $K_{s-1,L+d-1}$; $T_I$; $T_K$; and/or d.

Structure may be provided (e.g., based on categories described herein) for an eBCS information public action frame to communicate multiple (e.g., a list of) eBCS services and associated origin authentication parameters.

An eBCS service advertisement may be provided via an eBCS information public action frame. An eBCS information frame may be sent (e.g., periodically), for example, by a generating STA (e.g., AP and non-AP), for example, to indicate that the eBCS services are available.

FIG. 2 depicts an example format of an example eBCS information frame. A category field may be set to a value representing eBCS (e.g., 34, as shown by example in Table 1). An eBCS public action field may be set to a value for an eBCS information frame (e.g., 0, as shown by example in Table 2). An eBCS sequence number (e.g., a 16-bit number) may indicate the sequence of a frame within an eBCS (e.g., general) stream. An origin authentication (OA) (e.g., a bit) may indicate (e.g., if set to 1) that an origin authentication may be in place for the eBCS (e.g., as discussed herein). Public key, signature, and/or timestamp fields may be present, for example, if the OA field indicates (e.g., by being set to 1) that an origin authentication may be in place for the eBCS. A public key field may be, for example, as described herein. A signature field may include the signature of the frame, for example, using the private key corresponding to the public key provided in the public key field. A timestamp field may provide a value obtained from a timing synchronization function. A common parameters (CP) bit may indicate (e.g., if/when set to 1) that the frame includes a common eBCS origin authentication field. A common eBCS origin authentication field may be of type eBCS origin authentication (e.g., as described herein). A common eBCS origin authentication field may provide information that may be used for origin authentication for eBCS services (e.g., services may or may not have a specific key). An eBCS service count may be an octet string. An eBCS service count may indicate the number of eBCS service list elements (e.g., as described herein) that may be included in an eBCS service list field.

An eBCS public action frame may include one or more elements (e.g., fields, subfields). FIG. 3 depicts an example of a public key field (e.g., in an example eBCS information frame). A public key field may include one or multiple (e.g., two) subfields. A group field may (e.g., be used to) indicate which cryptographic group was used when generating the public key. A public key field may include the public key of the generating STA (e.g., AP and non-AP), which may be signed by a CA authority. A STA may send a public key frame encoded as an octet string.

A certificate ID may include, for example, a Unicode transformation format 8 (UTF-8) string, which may indicate an identifier assigned to the STA in a particular manner (e.g., outside of a specified scope). A certificate ID may be, for example, a WiFi certified interoperability certificate ID (e.g., in the form of "WFA3991"). A certificate ID may be used by a receiving STA, for example, to look up a certificate assigned to the certificate ID.

An eBCS origin authentication parameters field may be used/implemented (e.g., in an example eBCS information frame). FIG. 4 depicts an example of an eBCS authentication parameters field (e.g., in an example eBCS information frame). A length field (e.g., 16 bits) may indicate the length of an eBCS origin authentication parameter field element. An eBCS sequence number (e.g., a 16-bit number) may indicate the sequence of a frame within a specific eBCS service, which may (e.g., be used to) support different origin authentication keys per service. A different sequence number may be used per service. A key of a current sequence field may indicate a key that may be used to protect an eBCS information frame (e.g., $K_{s,N}$, where s may be a sequence number carried in the eBCS Sequence number field). A distance field may correspond to the number of frames to be buffered for a service (e.g., referred to as d). The key of the last index field may correspond to the key with the last used key index (e.g., referred to as $K_{s-1,L}$). The key of a distance field may correspond to the key to be used for the last frame in the period, for example, at a distance d from the starting frame (e.g., referred to as $K_{s-1,L+d-1}$). An eBCS information frame period field may represent the number of time units (TUs) between eBCS information frames carrying key information for an eBCS service (e.g., referred to as $T_I$). An eBCS rekeying period field may represent the number of TUs between changes in the key for the eBCS service (e.g., referred to as $T_k$).

Service list elements (e.g., for eBCS) may be used/implemented (e.g., in an example eBCS information frame). FIG. 5 depicts an example of an eBCS service list. An (e.g., each) element of an eBCS service list may, for example, follow the format indicated by example in FIG. 5. A length field may indicate the length of an element of an eBCS service list. An eBCS ID field may include an identifier for an eBCS service that may be mapped to packets received by the STA. A (e.g., each) eBCS ID field may, for example, follow the example format indicated in FIG. 6.

FIG. 6 depicts an example format for an example eBCS ID field. A type field (e.g., as shown by example in FIG. 6) may indicate the type of ID that may be used in the element of the eBCS ID list. A type field may take values, for example, as specified by example in Table 3.

TABLE 3

Example of identifier types and lengths

| Type | Description | Length of Element (bits) |
|---|---|---|
| 0 | IPv4 Address | 32 |
| 1 | IPv6 Address | 128 |
| 2 | MPEG Transport Stream Identifier | 32 |
| 3 | MAC Address | 48 |

An element field (e.g., as shown by example in FIG. 6) may include an actual identifier of the type and length (e.g., as defined by example in Table 3). A content with restrictions field (e.g., as shown by example in FIG. 5) may be, for example, one bit. A content with restrictions field may indicate, for example, whether/if the eBCS service involves (e.g., requires) registration or a cypher key, which may be obtained off-line. A human readable description field may provide a human readable description, which may be used to provide an end-user with a view the contents of the eBCS service. A URL field may provide a URL, which may be presented to a user, (e.g., automatically) accessed for registering to a specific channel, and/or used to get a subscription key. A URL may be accessed (e.g., through a relevant technology) to get the key that may be used to decrypt the information in the frames. An eBCS service origin authentication field may indicate (e.g., if/when set to 1), for example, whether/if the eBCS service described in the eBCS service list element includes an eBCS origin authentication parameters field (e.g., with parameters, as described herein).

Service advertisement (e.g., eBCS advertisement) may be implemented, for example, in information frames (e.g., eBCS information frames). Origin authentication of frames may be based on the periodic sending of a frame, which may include a key to authenticate one or more (e.g., all) frames sent by an originating STA during a period.

Figure 7:
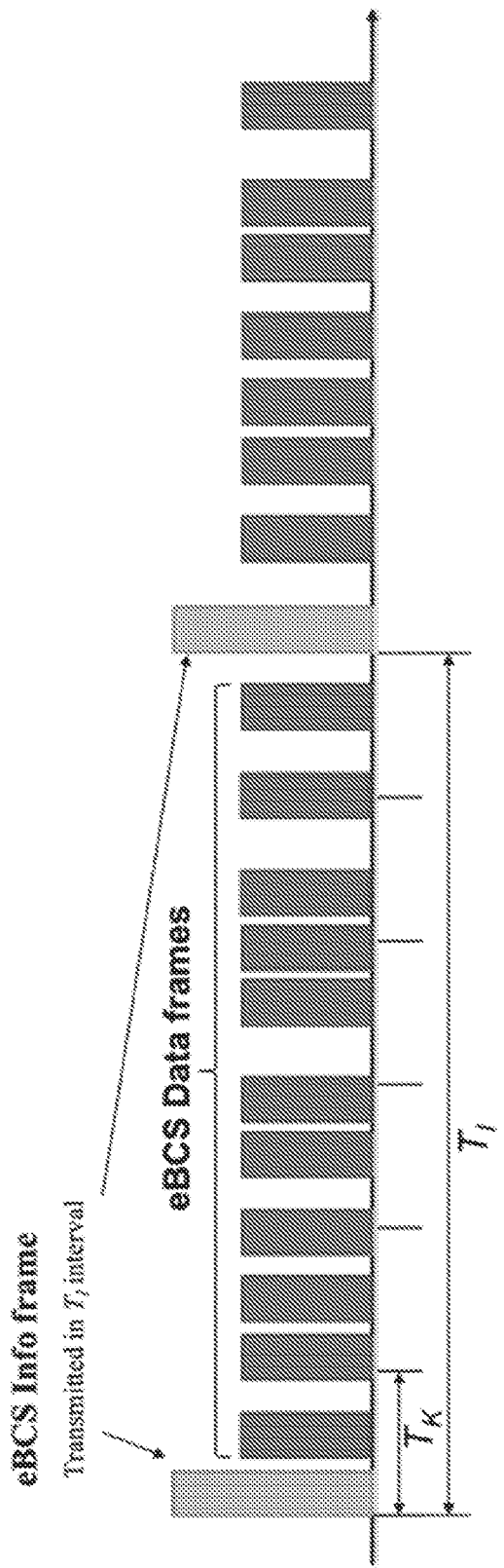
FIG. 7 depicts an example of eBCS information frames, e.g., relative to eBCS data frames.

FIG. 7 depicts an example of eBCS information frames (e.g., identified in FIG. 7 by labels, arrows, and light gray shading). An information frame may be transmitted, for example, every $T_I$ seconds. An information frame may be used to authenticate (e.g., in a recurrent fashion) the eBCS Data frames (e.g., associated with service(s)).

An (e.g., each) eBCS information (info) frame may include, for example, one or more of the following: $K_{s,\,N}$ (e.g., where s may be a sequence number of eBCS information); $K_{s-1,L}$ (e.g., where L may be the last used key index); $K_{s-1,L+1}$ (e.g., if d=2); a timestamp; $T_1$; $T_K$; d; an eBCS information sequence number; a public key with a CA signature; and/or a signature by the sender's private key.

The structure of an information frame may vary (e.g., may be limited), for example, based on one or more issues, conditions and/or configurations, such as a configuration of an STA to utilize an (e.g., a single) eBCS service to receive and buffer frames for multiple (e.g., all) eBCS services.

Figure 8:
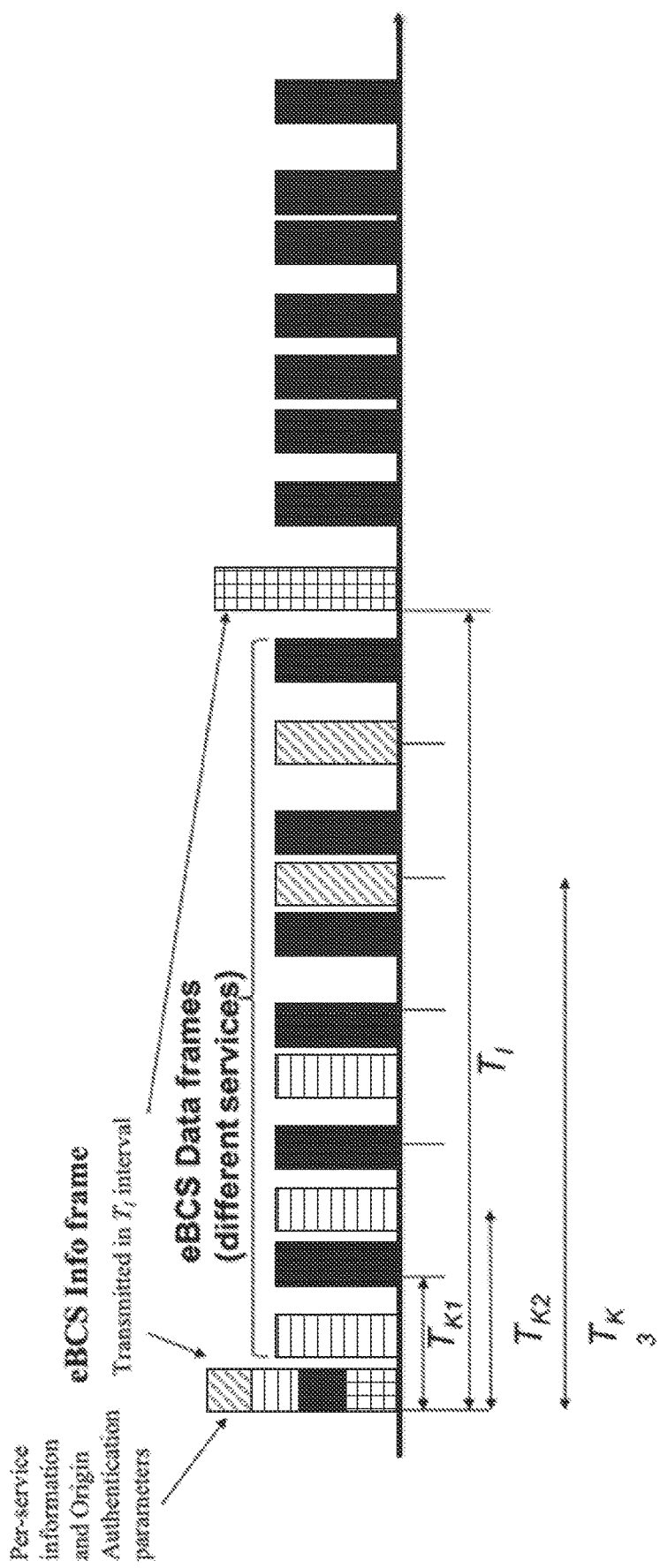
FIG. 8 depicts an example of a per-service eBCS information frame.

FIG. 8 depicts an example of a per-service eBCS information frame. A per-service eBCS information frame may be a mechanism that may be used to send information (e.g., as described herein) on a per-service basis (e.g., joining origin authentication information with eBCS service discovery). Information frames (e.g., eBCS information frames) may carry one or more of the following information: an eBCS information sequence number; a public key with a CA signature; a signature by the sender's private key; a timestamp; common eBCS origin authentication parameters for services that may be origin authenticated in a common way; a list of services that may be provided by the originating STA (e.g., AP or non-AP); and/or per service origin authentication information.

Services (e.g., eBCS services) that may be broadcast by an STA (e.g., AP or non-AP) may be configured, for example, so that multiple (e.g., all) frames (e.g., data frames associated with service(s)) may be authenticated through (e.g., the same) one or more keys and mechanisms. An eBCS Information frame may be (e.g., periodically) transmitted periodically. An eBCS Information frame may include (e.g., common) eBCS origin authentication parameters, for example, along with parameters that may be used to authenticate multiple (e.g., all) frames.

A service may determine that the service may be preferred. For example, a service may determine that the service is better due to the service's characteristics that permit the service's frames to be authenticated separately, for example, in order to reduce buffering. A generating STA (e.g., AP or non-AP) may send a different eBCS information frame with the eBCS service definition and authentication parameters, for example, to support a service determination. Information may be sent, for example, through a separated eBCS information frame or, for example, by sending an (e.g., a single) eBCS information frame, which may include (e.g., all) eBCS services information.

An eBCS information frame definition (e.g., configuration) may enable transmission of an (e.g., a single) eBCS information frame, which may include/join information for origin authentication and advertisement of an eBCS service (e.g., advertised by a generating STA).

An eBCS service (e.g., that is not using origin authentication functionality) may be advertised, for example, by providing a service description and/or by indicating that the eBCS service does not use origin authentication. Common eBCS origin authentication parameters may be used, for example, if/when an eBCS service does not use origin authentication functionality.

Service (e.g., eBCS service) consumer reporting may employ (e.g., may be implemented with) public action frames, for example, for stations to report consuming (e.g., listening to) specific (e.g., identifiable) eBCS services. Discovery of STAs consuming a specific eBCS may be implemented with one or more mechanisms. One or more (e.g., two) public action frames may be used to discover the eBCS services consumed by one or more stations (STAs).

One or more (e.g., several) public action frame formats may be defined (e.g., configured) to support enhanced broadcast services (eBCS). Table 4 shows an example of eBCS action field values associated with a (e.g., each) frame format within an eBCS category. Table 4 may be interpreted as a continuation of Table 2.

TABLE 4

Example of eBCS public action field values

| eBCS public action field value | Meaning |
| --- | --- |
| 3 | eBCS Membership Request |
| 4 | eBCS Membership Response |

An eBCS membership request may be associated with an eBCS membership request frame format. An eBCS membership request frame may be sent to an STA, for example, to request eBCS services that the STA may be listening to or consuming. An action field of an eBCS membership request frame may include information (e.g., as shown by example in FIG. 9).

FIG. 9 depicts an example format for an example eBCS membership request frame. A category field may be set to a value representing eBCS (e.g., 34, as shown by example in Table 1). An eBCS public action field may be set to a value for an eBCS membership request frame (e.g., 3, as shown by example in Table 4). A dialog token field may be set by the requesting STA, for example, to a nonzero value that may be used for matching action responses with action requests.

An eBCS membership response may be associated with an eBCS membership response frame format. An eBCS membership response frame may be sent by an STA, for example, in response to an eBCS membership request frame. For example, an eBCS membership response frame may be solicited (e.g., sent in response to a query) or may be unsolicited (e.g, sent upon a change in the list of eBCS services that the STA may listen to). An action field of an eBCS membership response frame may include information (e.g., as shown by example in FIG. 10).

FIG. 10 depicts an example of an eBCS membership response frame. A category field may be set to a value representing eBCS (e.g., 34, as shown by example in Table 1). An eBCS action field may be set to a value for an eBCS membership response frame (e.g., 4, as shown by example in FIG. 4). A dialog token field may be set, for example, to a nonzero value of the corresponding eBCS membership request frame. A dialog token field may be set to a value (e.g., 0), for example, if the eBCS membership report frame is (e.g., being) transmitted for a reason other than in response to an eBCS membership request frame. A eBCS IDs count field may specify (e.g., indicate) the number of eBCS IDs that may be in the eBCS IDs list field. An eBCS ID list field may include zero or more higher layer IDs, which may indicate a set of eBCS's that may be listened to by the STA. A (e.g., each) element in a list field may follow a format (e.g., the format shown by example in FIG. 11).

FIG. 11 depicts an example of an eBCS ID list. A type field may indicate the type of ID used in an element of the eBCS ID list. A type field may have specified values (e.g., as shown by example in Table 3). An element field may include an actual identifier (e.g., of the type and length as shown by example in Table 3).

Reporting may be provided for eBCS services. Reporting may be solicited reporting or unsolicited reporting.

Figure 12:
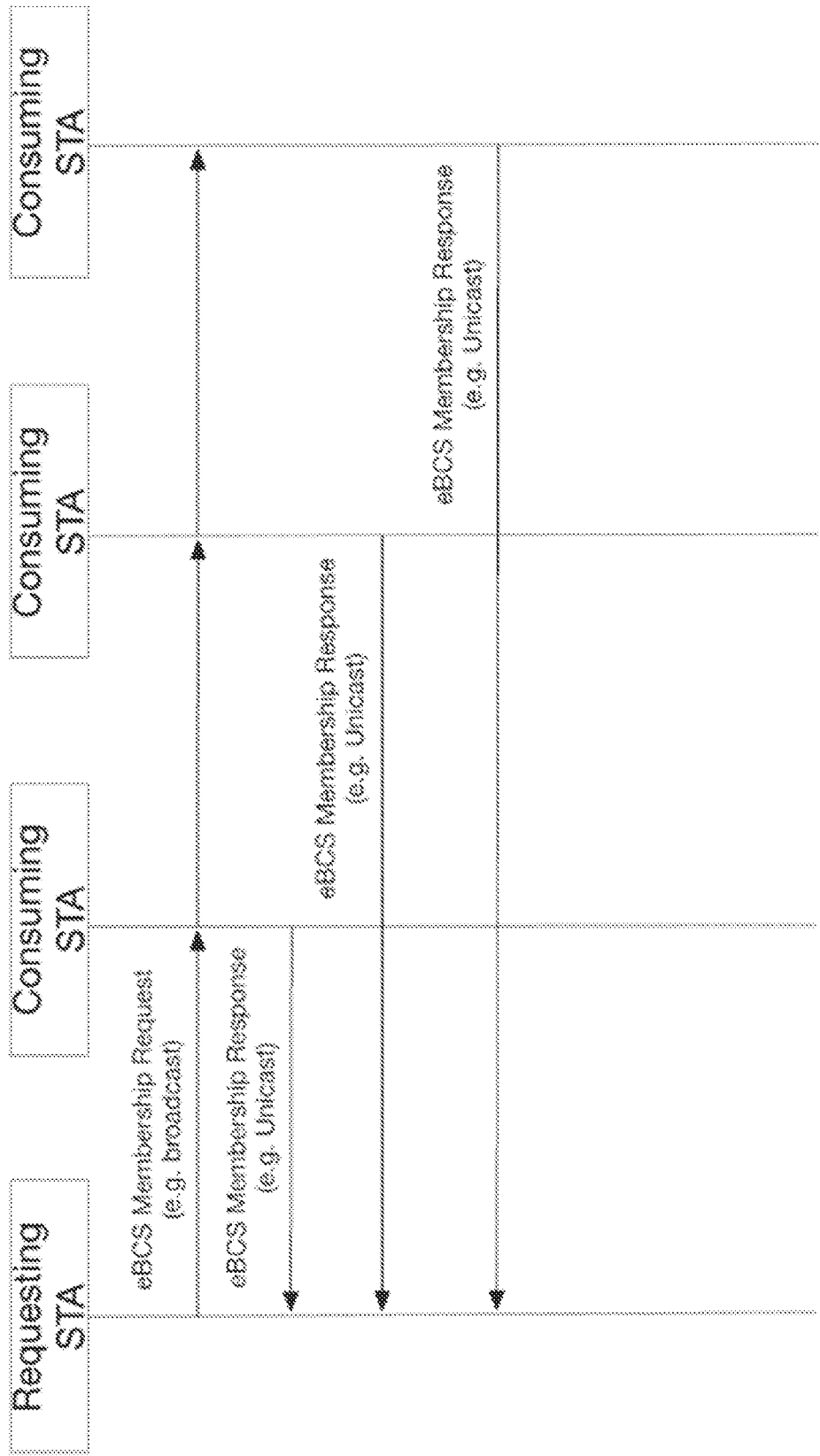
FIG. 12 depicts an example of a solicited eBCS membership request and response.

FIG. 12 depicts an example of a solicited eBCS membership request and response. As shown by example in FIG. 12, an STA (e.g., AP or non-AP) may (e.g., using frames defined herein) request information on/about (e.g., different) eBCS services that may be or are being consumed in a network. A reporting operation may be based on a request/response mechanism. For example, a STA (e.g., AP or non-AP) may send an eBCS membership request (e.g., in broadcast/ multicast or unicast) requesting information on the services that may be consumed. STAs listening to the frame may answer, for example, with an eBCS membership response frame, which may indicate IDs of the eBCS services being consumed.

Figure 13:
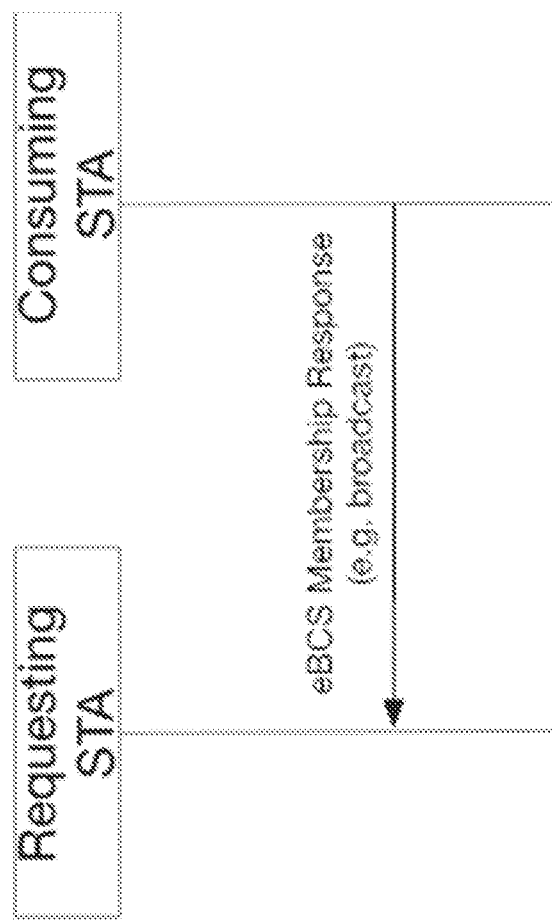
FIG. 13 depicts an example of an unsolicited eBCS membership response.

FIG. 13 depicts an example of an unsolicited eBCS message response. As shown by example in FIG. 13, an STA that consumes (e.g., starts consuming) a service may send an eBCS membership response frame (e.g., in broadcast, multicast, or unicast) to advertise that the STA is consuming a service. The STA may provide an indication of consumed services without receiving an eBCS membership request message.

Systems, methods and instrumentalities have been disclosed herein (e.g., including via example implementations) for distributing (e.g., eBCS) service information. Service (e.g., eBCS) capabilities may be advertised (e.g., by an access point (AP)), for example, by broadcasting a public action frame. A public action frame may include per-service information. A public action frame may be transmitted on a per service basis. A public action frame may combine authentication information and service information. Enhanced broadcast service origin authentication may be performed on a per service basis (e.g., using origin authentication information to authenticate broadcast data frames for a consumed service). Origin authentication information may be common to frames associated with different services. Services may be consumed without querying a service originating device. Stations (e.g., with and without association with an AP) may report consumption or usage of services. Reporting may be unsolicited or solicited (e.g., in response to a request from an AP).

It will be appreciated that while illustrative embodiments have been disclosed, the scope of potential embodiments is not limited to those explicitly set out. For example, while the system has been described with reference to 802.11 and particular frames with particular contents, the envisioned embodiments extend beyond implementations using these technologies. The potential implementations extend to all types of service layer architectures, systems, and embodiments. The techniques described herein may be applied independently and/or used in combination with other resource configuration techniques.

It is understood that the entities performing the processes described herein may be logical entities that may be implemented in the form of software (i.e., computer-executable instructions) stored in a memory of, and executing on a processor of, a mobile device, network node or computer system. That is, the processes may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in the Figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (i.e., instructions) embodied in tangible media, or any other machine-readable storage medium wherein, when the program code is loaded into and executed by a machine, such as a computing device, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Although the features and elements may be described herein in particular combinations, each feature or element may be used alone, without the other features and elements, and/or in various combinations with or without other features and elements.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed is:

1. A wireless transmit/receive unit (WTRU) comprising:
   a processor; and
   a transceiver, wherein
   the transceiver and the processor are configured to:
      receive a broadcast frame, wherein the broadcast frame includes per-service information and per-service origin authentication information, wherein the per-service information includes first service information for a first service and second service information for a second service, and wherein the per-service origin authentication information includes a first origin authentication information and a second origin authentication information;
      receive a broadcast data frame for a service, wherein the service is the first service associated with the first service information included in the broadcast frame; and
      use the first origin authentication information to authenticate the broadcast data frame associated with the first service.

2. The WTRU of claim 1, wherein the WTRU includes a station (STA).

3. The WTRU of claim 1, wherein the first service information includes a first service identifier, a first content with a first restrictions indicator, a first human readable description, and a first URL, and wherein the second service information includes a second service identifier, a second content with a second restrictions indicator, a second human readable description, and a second URL.

4. The WTRU of claim 1, wherein the processor is further configured to:
   use the service indicated in the broadcast frame based on a successful authentication.

5. The WTRU of claim 1, wherein the per-service information includes a service definition, and wherein the per-service origin authentication information includes a per-service authentication parameter.

6. The WTRU of claim 1, wherein a portion of the per-service origin authentication information included in the broadcast frame is associated with the first service.

7. The WTRU of claim 1, wherein at least a portion of the per-service origin authentication information is common to frames associated with different services.

8. The WTRU of claim 1, wherein the processor is further configured to send a request that indicates one or more services to be used by the WTRU, wherein the request that indicates the one or more services to be used by the WTRU includes one or more respective identifiers associated with one or more devices associated with transmission of the indicated one or more services.

9. The WTRU of claim 1, wherein the processor is further configured to use the first service indicated in the broadcast frame, and wherein the first service is used without a query being sent from the WTRU to an originating device that provides the first service.

10. A method comprising:
    receiving a broadcast frame, wherein the broadcast frame includes per-service information and per-service origin authentication information, wherein the per-service information includes first service information for a first service and second service information for a second service, and wherein the per-service origin authentication information includes first origin authentication information and second origin authentication information;
    receiving a broadcast data frame for a service, wherein the service is the first service associated with the first service information included in the broadcast frame; and
    using the first origin authentication information to authenticate the broadcast data frame associated with the first service.

11. The method of claim 10, wherein the first service information includes a first service identifier, a first content with a first restrictions indicator, a first human readable description, and a first URL, and wherein the second service information includes a second service identifier, a second content with a second restrictions indicator, a second human readable description, and a second URL.

12. The method of claim 10, further comprising using the service indicated in the broadcast frame based on a successful authentication.

13. The method of claim 10, wherein the per-service information includes a service definition, and wherein the per-service origin authentication information includes a per-service authentication parameter.

14. The method of claim 10, wherein a portion of the per-service origin authentication information included in the broadcast frame is associated with the first service.

* * * * *